Patented May 11, 1937

2,079,626

UNITED STATES PATENT OFFICE 2,079,626

SYNTHETIC RESIN VARNISHES AND SYNTHETIC RESINS

Howard Houlston Morgan, Slough, and Alan Ashby Drummond, Iver, England, assignors to Imperial Chemical Industries Limited, London, England No Drawing. Application October 23, 1929, Serial No. 401,966. In Great Britain November 9, 1928

2 Claims. (Cl. 260—4)

This invention relates to synthetic resin varnishes and synthetic resins, particularly those made from phenolic compounds and formaldehyde in which fatty acid esters, such as drying oils or the like, are incorporated.

The object of the invention is to provide an improved or modified process for the manufacture of synthetic resin varnishes and synthetic resins, and improved or modified synthetic resins.

The invention consists in a method of making synthetic resin varnishes and the like, which comprises the incorporation of phenolic compounds and formaldehyde or of products formed by the condensation of phenolic compounds and formaldehyde, with fatty acid esters in the presence of an organic solvent, and preferably also in the presence of a catalyst, in such close combination or solution that protective films can readily be obtained on drying.

The invention also consists in a process according to the preceding paragraphs, in which the solvent or solvents employed is or are chosen from the following, viz., cyclohexanol and homologues, benzyl alcohol, mono alkyl ethers of ethylene glycol, ketones, esters, turpentine.

The invention also consists in a form or modification of the methods according to either of the preceding two paragraphs carried out by condensing, for a number of hours, formaldehyde with phenol or its homologues or with mixtures of phenols in the presence of excess of an organic solvent which is a solvent both for the components and for the resinous reaction product such as an alcohol or ketone of the aliphatic series, cyclohexanol or its homologues, benzyl alcohol or turpentine, preferably with an alkaline catalyst, after which the product is acidified with a suitable and preferably weak acid such as boric acid and distilled in the presence of benzyl alcohol, cyclohexanol or other solvent having a high boiling point until the boiling point indicates that all water has been removed, the fatty acid ester being then added, and distillation continued until a drop of the solution dries clear when tested on metal plate.

The invention also consists in a process according to any of the preceding three paragraphs, in which the fatty acid ester or esters is or are chosen from the following oils, (either raw or treated), viz., wood oil, linseed, perilla, soya, fish, olive, rape seed, cotton seed, or castor oils.

The invention also consists in a process according to any of the preceding four paragraphs, in which the phenolic compound is chosen from the following, viz., phenol, phenol homologues, mixtures of phenols including coal tar fractions known industrially as cresylic acid, pale cresylic acid, dark cresylic acid, refined cresylic acid, B. cresylic acid, crude metal-cresol,, xylenol mixtures, creosote oils and the like.

The invention also consists in a process according to any of the preceding five paragraphs, in which driers are added either before, during or after the reaction, in order to accelerate drying.

The invention also consists in methods of making synthetic resin varnishes and the like substantially as hereinafter described.

The invention also consists in the manufacture of the non-volatile part of synthetic resin varnishes or the like according to processes as indicated herein, that is to say, the part left after distillation or evaporation of the solvents and includes the employment of the bodies thus prepared, for example their employment in sheet or in massive form.

The invention also consists in the employment of colors or pigments in processes as referred to herein.

The invention also consists in synthetic resin varnishes and the like and synthetic resins, such as may be made by methods substantially as herein described.

The following examples illustrate how the invention may be carried into effect, references to parts being to parts by weight:—

Example 1

About 32 parts of cresylic acid, 14 parts of paraformaldehyde, and 32 parts of raw wood oil, are heated at steam temperature with 40 parts of cyclohexanol and 10 parts of a solution of caustic soda in industrial methylated spirit (containing 2 gms. NaOH per 100 cc. methylated spirit). After 24 hours, the solution is cooled, the separated aqueous layer removed, and the remaining solution filtered through salt. The filtrate is a viscous, clear, bright reddish-brown liquid which can be thinned as desired with white spirit or other suitable solvent.

A film of the varnish prepared in this way dries on metal plate at steam temperature in a few hours, giving a glossy, flexible yellow coating, which is resistant to the usual solvents.

By the addition of a drier to the solution, a resistant flexible film can be obtained in a shorter time. With drier, the films dry in air to a clear yellow film softened by, but not soluble in, the usual solvents.

Example 2

The proportions of reacting materials as in Example 1 are used, substituting butyl acetate for cyclohexanol. After 36 to 48 hours' heating at steam temperature, the product is separated from the aqueous layer and filtered through salt. The filtered varnish so obtained forms a glossy, flexible yellow resistant film on metal plate in a few hours at steam temperature. Added drier accelerates the drying.

Example 3

The proportions of reacting materials as in Example 1, substituting blown linseed oil for wood oil. After 60 to 90 hours' heating, the product is separated from the aqueous layer and filtered through salt. The solution thinned with butyl acetate or other suitable solvent dries in a few hours at steam temperature to a glossy flexible, yellow film resistant to solvents. Driers may be added to accelerate drying.

Example 4

About 36 parts of cresylic acid, 14 parts of paraformaldehyde are boiled in 40 parts of industrial methylated spirit in the presence of 10 parts of a solution of caustic soda in methylated spirit (2 gms. NaOH in 100 cc. methylated spirit). After 12 to 15 hours, the product is acidified with 0.4 part boric acid and mixed with 120 parts of cyclohexanol and distilled until the boiling temperature of the residue is about 180° C. 32 parts of wood oil are then added, and the distillation continued until a drop of the mixture on metal plate dries clear and glossy when heated over a gas flame. The resulting product may be thinned to the desired consistency with naphtha or other suitable solvent.

Example 5

About 36 parts of cresylic acid, 14 parts of paraformaldehyde, are boiled in 40 parts of cyclohexanol in the presence of 10 parts of a solution of caustic soda in methylated spirit (strength as in Example 4). After 12 to 15 hours the product is acidified with 0.4 part boric acid and mixed with 100 parts of benzyl alcohol and distilled until the boiling temperature of the residue is about 170° C. 40 parts of blown linseed oil are then added and the mixture distilled until a drop of the mixture dries clear when tested as in Example 4. The resultant product may be thinned to the desired consistency with naphtha or other suitable solvent.

Example 6

About 36 parts of cresylic acid, 14 parts of paraformaldehyde, and 32 parts of raw wood oil are heated at steam temperature for about 48 hours, in the presence of 1 part of boric acid dissolved in about 9 parts of methylated spirit. The product can be used as a varnish either with or without the addition of an organic solvent. Driers may be added to accelerate drying.

The process may also be modified by condensing, for a number of hours, formaldehyde with phenol or its homologues or with mixtures of phenols, in the presence of excess of an organic solvent such as an alcohol or ketone of the aliphatic series, cyclohexanol or its homologues, benzyl alcohol or turpentine, preferably with an alkaline catalyst, after which the product is acidified with a suitable and preferably weak acid, such as boric acid, and distilled in the presence of benzyl alcohol, cyclohexanol or other solvent having a high boiling point until the boiling point indicates that all water has been removed, the fatty acid ester being then added, and distillation continued until a drop of the solution dries clear when tested on metal plate.

General

By means of the processes described above, improved or modified synthetic resin varnishes may be made from phenolic compounds and formaldehyde, in which fatty acid esters such as drying oils and the like are incorporated in such close combination or solution that protective coatings can be readily obtained on drying, and drying may be accelerated by the use of driers. After suitable stoving, coatings can be obtained which are resistant to the action of the usual solvents and chemical reagents, and have electrical insulating properties.

By means of the processes described above, varnishes can be prepared direct without preliminary isolation of a resin.

If desired, the non-volatile part of the synthetic resins, that is, the part left after distillation or evaporation of the solvents may be employed for any suitable purpose, for example, in sheet or in massive form.

If desired, colors or pigments may be used in the processes referred to above.

We claim:

1. A process which comprises heating together formaldehyde and a phenol in the presence of an alkaline catalyst and a volatile organic solvent for the reaction product boiling within the range of about 160° C. to about 210° C., acidifying the product with a weak acid, distilling the acidified product until water is removed, adding thereto an ester of a fatty oil acid, and continuing the distillation until a drop of the solution dries clear when tested on a hot plate.

2. The process of claim 1 in which said weak acid is boric acid.

HOWARD HOULSTON MORGAN.
ALAN ASHBY DRUMMOND.